(12) United States Patent
Grant

(10) Patent No.: US 12,201,936 B2
(45) Date of Patent: Jan. 21, 2025

(54) GAS RECOVERY METHOD

(71) Applicant: Gas Recovery and Recycle Limited, Salfords (GB)

(72) Inventor: Robert Bruce Grant, Salfords (GB)

(73) Assignee: Gas Recovery and Recycle Limited (GB)

( * ) Notice: Subject to any disclaimer, the term of this patent is extended or adjusted under 35 U.S.C. 154(b) by 643 days.

(21) Appl. No.: 17/295,274

(22) PCT Filed: Nov. 20, 2019

(86) PCT No.: PCT/GB2019/053289
§ 371 (c)(1),
(2) Date: May 19, 2021

(87) PCT Pub. No.: WO2020/104801
PCT Pub. Date: May 28, 2020

(65) Prior Publication Data
US 2022/0016568 A1    Jan. 20, 2022

(30) Foreign Application Priority Data

Nov. 20, 2018  (GB) ..................................... 1818896

(51) Int. Cl.
*B01D 53/04*  (2006.01)
*B01D 53/047*  (2006.01)
(Continued)

(52) U.S. Cl.
CPC ..... *B01D 53/0476* (2013.01); *B01D 53/0438* (2013.01); *B01J 20/20* (2013.01);
(Continued)

(58) Field of Classification Search
CPC ............ B01D 53/0476; B01D 53/0438; B01D 2253/1085; B01D 2256/18;
(Continued)

(56) References Cited

U.S. PATENT DOCUMENTS 3,996,028 A * 12/1976 Golovko ................ F25J 3/0285
95/902
4,732,580 A * 3/1988 Jain ...................... F25J 3/04648
95/122
(Continued)

FOREIGN PATENT DOCUMENTS

CN         101628198 A  *  1/2010
CN         106178807 A  * 12/2016  ........... B01D 53/002
(Continued)

OTHER PUBLICATIONS

GB Examination Report issued on Jun. 10, 2022 for GB Patent Application No. GB 1916911.9; pp. 1-5.
(Continued)

*Primary Examiner* — Stephen Hobson
(74) *Attorney, Agent, or Firm* — Bell & Manning, LLC

(57) ABSTRACT

The invention provides a process of purifying a fluid useful in a manufacturing process, particularly in the manufacture of silicon wafers, by removing one or more impurities; and apparatus for use in the process.

16 Claims, 7 Drawing Sheets

(51) Int. Cl.
*B01J 20/20* (2006.01)
*B01J 20/34* (2006.01)

(52) U.S. Cl.
CPC ... *B01J 20/3408* (2013.01); *B01D 2253/1085* (2013.01); *B01D 2256/18* (2013.01); *B01D 2257/102* (2013.01); *B01D 2257/504* (2013.01); *B01D 2257/80* (2013.01); *B01D 2259/40007* (2013.01); *B01D 2259/416* (2013.01); *B01J 2219/00054* (2013.01)

(58) Field of Classification Search
CPC ........ B01D 2257/102; B01D 2257/504; B01D 2257/80; B01D 2259/40007; B01D 2259/416; B01D 2253/108; B01D 2256/12; B01D 2256/20; B01D 2256/22; B01D 2256/245; B01D 53/04; B01D 53/0407; B01D 53/047; B01J 20/20; B01J 20/3408; B01J 2219/00054; C01B 2210/0045; C01B 2210/005; C01B 2210/007; C01B 23/0068; C01B 23/0052; C01B 2210/0034; C01B 2210/0046; C01B 2210/0051; Y02C 20/40
See application file for complete search history.

(56) References Cited

U.S. PATENT DOCUMENTS

| | | | | |
|---|---|---|---|---|
| 4,964,889 A * | 10/1990 | Chao | ...................... | B01J 20/186 95/902 |
| 5,080,694 A * | 1/1992 | Knoblauch | ........ | B01D 53/0476 95/143 |
| 5,089,048 A * | 2/1992 | Knoblauch | ............. | C01B 23/00 95/143 |
| 5,797,979 A * | 8/1998 | Quinn | .................... | B01D 53/02 96/144 |
| 6,068,679 A * | 5/2000 | Zheng | ................ | B01D 53/0476 96/144 |
| 6,309,445 B1 * | 10/2001 | Gittleman | .............. | B01D 53/02 95/902 |
| 9,708,188 B1 * | 7/2017 | Bhadra | ................ | B01D 53/047 |
| 2006/0099096 A1 * | 5/2006 | Shaffer | ............... | F04C 18/0276 418/55.1 |
| 2006/0162556 A1 * | 7/2006 | Ackley | ................... | B01J 20/18 95/96 |
| 2007/0051238 A1 * | 3/2007 | Jain | .......................... | C10K 1/32 95/96 |
| 2009/0193967 A1 * | 8/2009 | Whitley | .............. | C01B 23/0026 96/144 |
| 2010/0266463 A1 * | 10/2010 | Ota | ......................... | C01B 13/10 422/186.11 |
| 2011/0052483 A1 * | 3/2011 | Tabata | ................ | C01B 13/0203 423/581 |
| 2011/0120184 A1 * | 5/2011 | Seeley | ....................... | F25J 3/08 62/636 |
| 2012/0180389 A1 * | 7/2012 | Knaebel | .................. | B01D 53/75 48/127.3 |
| 2012/0308462 A1 * | 12/2012 | Grant | ....................... | B01D 20/20 422/187 |
| 2013/0152795 A1 * | 6/2013 | Patel | .................. | B01D 53/0407 96/152 |
| 2014/0033764 A1 * | 2/2014 | Higginbotham | ......... | F25J 3/067 62/639 |
| 2015/0037187 A1 * | 2/2015 | Turner | ................... | F04C 18/126 418/9 |
| 2015/0078927 A1 * | 3/2015 | Forni | ...................... | F04B 25/00 417/244 |
| 2016/0166978 A1 * | 6/2016 | Tai | ..................... | B01D 53/0462 95/26 |
| 2016/0228813 A1 * | 8/2016 | Schwartz | ............ | C01B 23/0021 |
| 2016/0231051 A1 * | 8/2016 | Shah | .................... | C01B 23/0078 |
| 2017/0045290 A1 * | 2/2017 | Ploeger | ...................... | F25J 3/061 |
| 2017/0107162 A1 * | 4/2017 | Duggal | ..................... | C07C 1/12 |
| 2017/0326494 A1 * | 11/2017 | Gebald | ............. | B01J 20/28052 |
| 2018/0318750 A1 * | 11/2018 | Zhong | ..................... | C10K 1/002 |
| 2024/0053094 A1 * | 2/2024 | Gaertner | ................ | F25J 3/0261 |
| 2024/0150188 A1 * | 5/2024 | Radaelli | ................. | B01D 53/002 |
| 2024/0154796 A1 * | 5/2024 | Grant | .................... | H04L 9/0869 |

FOREIGN PATENT DOCUMENTS

| | | | | |
|---|---|---|---|---|
| CN | 107789949 | | 3/2018 | |
| CN | 107789949 A | * | 3/2018 | ......... B01D 53/0476 |
| WO | WO 2011/092507 A1 | | 8/2011 | |
| WO | WO-2016108731 A1 | * | 7/2016 | |

OTHER PUBLICATIONS

International Preliminary Report on Patentability for PCT/GB2019/053289, mailed Jun. 3, 2021.
International Search Report and Written Opinion for PCT/GB2019/053289, mailed Feb. 10, 2020.

* cited by examiner

GAS RECOVERY METHOD

CROSS REFERENCE TO RELATED APPLICATIONS

This application is a National Stage of International Application No. PCT/GB2019/053289, filed Nov. 20, 2019, which claims the benefit of GB Patent Application No. 1818896.1, filed Nov. 20, 2018, the contents of which are herein incorporated by reference.

TECHNICAL FIELD

The present invention relates to a process of purifying a fluid used in a manufacturing process, particularly in the manufacture of silicon wafers, by removing one or more impurities.

BACKGROUND

Silicon wafers are thin layers (slithers) of crystalline silicon, a semiconductor material, and are commonly used in solar photovoltaic cells and in microelectronic devices such as computers and mobile phones. Silicon wafers are typically cut from silicon ingots that may be manufactured in a vacuum furnace, a high temperature crystallization process under a controlled atmosphere. Such processes are commonly carried out under a noble gas, particularly argon, atmosphere and there is a need for high purity noble gases for use in the vacuum furnace process. The microelectronics industry requiring a total impurity level of 1 ppb while the solar photovoltaic industry requires a total impurity level of 1-2 ppm. Typically, the impurity levels required for the photovoltaic industry are achieved through the distillation of liquid air, a standard industrial process, whereas further purification steps are required to meet the ultra-high purity specifications required by the microelectronics industry, in particular to achieve the ultra-low nitrogen and methane levels required.

There is a further need for methods of purifying gases removed from such vacuum furnace processes to a high level of purity in order for the gases to be recycled. Ambient temperature purifiers are a known method of removing impurity species to the levels required by the microelectronics industry. Alternatively, medium temperature chemical looping combustion based purification systems are another known method. However, these methods do not remove methane or nitrogen, the impurity levels of which will rise with repeated recycling to ultimately unacceptable levels. A frequently used purification process to remove nitrogen and methane is the use of hot metal getters (eg titanium, zirconium, vanadium, aluminium, iron and/or alloys thereof) at a temperature of 400-700° C. However, the materials are expensive and cannot be regenerated. Furthermore, such hot metal getter processes are only efficient at removing nitrogen and methane at impurity levels of <10 ppm. Impurity levels, greater than approximately 10 ppm cause breakthrough, resulting in the need to stop the process and replace the getter, with associated costs and delay.

The use of molecular sieves as an adsorptive media at low temperatures for gas purification is discussed in US2016/0362298A1, and the process is stated to have the advantage that the molecular sieves can be regenerated. However, the known temperature swing process for regeneration of such media is time consuming, requires high energy input, and is therefore expensive since the apparatus must be warmed, regenerated, and then re-cooled. Known vacuum swing adsorption processes are also inefficient at removing the adsorbed gas and do not provide sufficiently high purity for industries such as the solar photovoltaic and microelectronic fields.

WO2011/092507A1 discusses a process of recovering an inert gas from a gas stream comprising the noble gas and oxidisable impurities, the process comprising oxidising the impurities in a chemical looping combustion (CLC) reactor and removing the resulting carbon dioxide and water from the gas stream.

SUMMARY OF THE INVENTION

The invention provides a process for purifying a fluid, the process comprising the steps of:
  1.1 Providing an insulated adsorption vessel (1) comprising an adsorptive media, preferably an aluminosilicate;
  1.2 Providing a first fluid F1;
  1.3 Cooling the insulated adsorption vessel (1) and/or cooling the first fluid, F1, to an operating temperature T1 in the range of from −40° C. to −130° C., preferably from −90° C. to −110° C.;
  1.4 Contacting the fluid F1 with the insulated adsorption vessel (1) to remove one or more impurities G1;
  1.5 Collecting the resulting purified fluid F2; and
  1.6 Regenerating the insulated adsorption vessel (1) by vacuum whilst maintaining the temperature of the vessel at a temperature in the range T1 to T1+50° C. (i.e. in the range +10° C. to −130° C.; preferably from −40° C. to −110° C.).

The process of the invention may comprise an additional preliminary adsorption step prior to the process steps described above. The invention therefore further provides a process for purifying a fluid, the process comprising the steps of:
  0.1 Providing a first adsorption vessel, which may be insulated, comprising an adsorptive media at an operating temperature T1-0 in the range of from +40° C. to −40° C., preferably from +15° C. to +30° C.;
  0.2 Providing a first fluid F1-0;
  0.3 Contacting the first fluid F1-0 with the adsorption vessel to remove one or more impurities G1-0;
  0.4 Collecting the resulting purified first fluid F1;
  1.1 Providing a second adsorption vessel, which is insulated, comprising an adsorptive media, preferably an aluminosilicate;
  1.3 Cooling the second adsorption vessel and/or cooling the first fluid, F1, to an operating temperature T1 in the range of from −40° C. to −130° C., preferably from −90° C. to −110° C.;
  1.4 Contacting the fluid F1 with the second adsorption vessel to remove one or more impurities G1;
  1.5 Collecting the resulting purified fluid F2; and
  1.6 Regenerating the second adsorption vessel by vacuum whilst maintaining the temperature of the vessel at a temperature in the range T1 to T1+50° C. (i.e. in the range +10° C. to −130° C.; preferably from −40° C. to −110° C.);
  wherein the one or more impurities G1 have a lower freezing point than the one or more impurities G1-0.

The invention further provides an alternative process for purifying a fluid, the process comprising the steps of
  0.1 Contacting a fluid F0 with an oxidation reactor to oxidise impurities in F0 to $CO_2$ and $H_2O$;
  0.2 Contacting the resulting fluid F0' with an adsorption vessel, A, to remove $CO_2$ and with an additional adsorption vessel, B, to remove $H_2O$; or 0.3 Contacting the resulting fluid F0' with a combined adsorption vessel AB to remove $CO_2$ and $H_2O$;
0.4 Collecting the resulting Fluid F1;
1.1 Providing an insulated adsorption vessel (1) comprising an adsorptive media, preferably an aluminosilicate;
1.3 Cooling the insulated adsorption vessel (1) and/or the fluid F1 to an operating temperature T1 in the range of from −40° C. to −130° C., preferably from −90° C. to −110° C.;
1.4 Contacting the optionally cooled fluid F1 with the insulated adsorption vessel to remove one or more impurities G1;
1.5 Collecting the resulting purified fluid F2; and
1.6 Regenerating the insulated adsorption vessel (1) by vacuum whilst maintaining the temperature of the vessel at a temperature in the range T1 to T1+50° C. (i.e. in the range +10° C. to −130° C.; preferably from −40° C. to −110° C.).

The invention further provides apparatus for use in a process for purifying, recovering and recycling a fluid according to the present invention, the apparatus comprising:

Optionally a heat exchange unit suitable for cooling a fluid F1 to a temperature in the range of from −40° C. to −130° C.,
An insulated adsorption vessel comprising an adsorptive media;
One or more isolation valves; and
A multi-stage vacuum pump.

DETAILED DESCRIPTION

Figure 1:
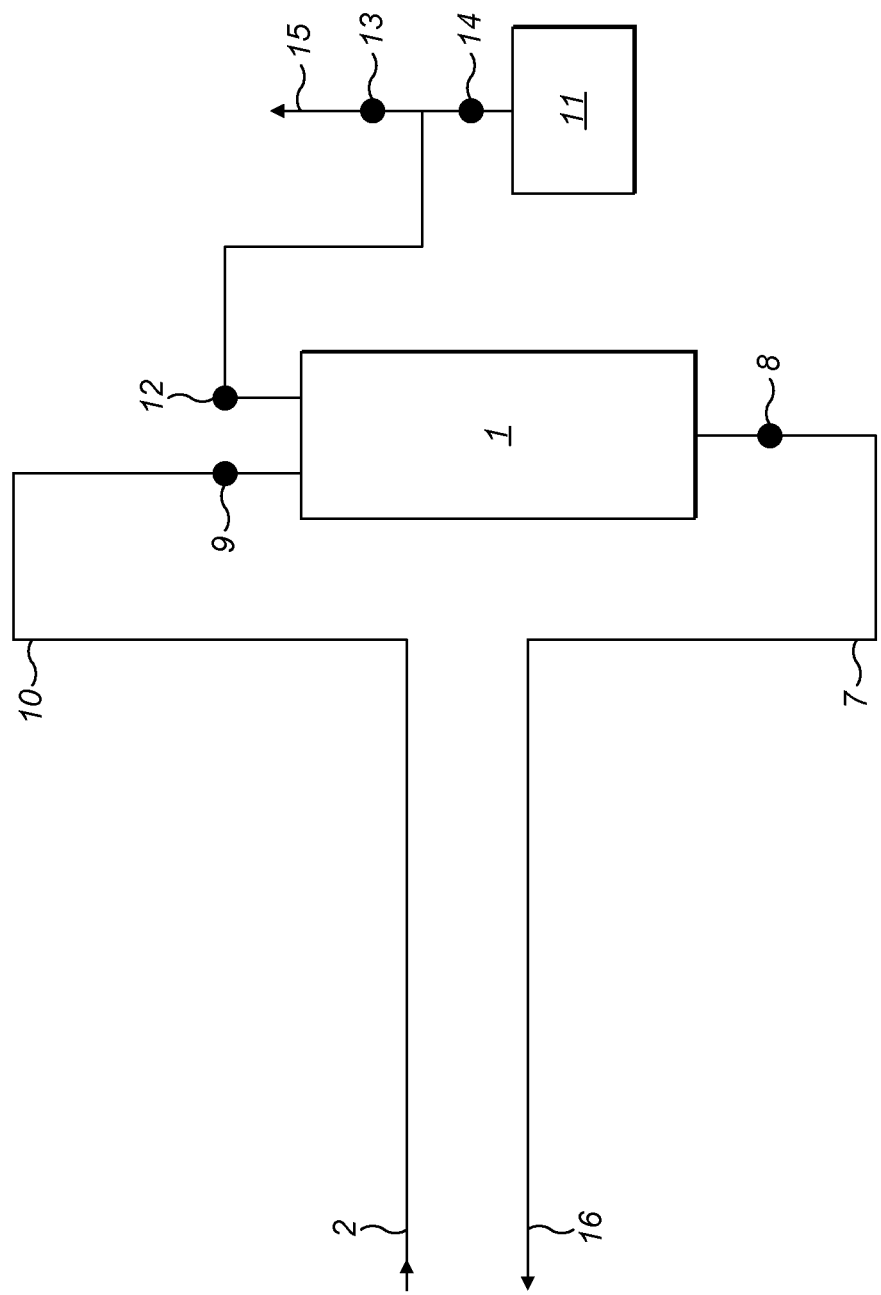
FIG. 1 shows an apparatus of the invention.

The invention provides an improved process for removing impurities such as nitrogen, oxygen, carbon dioxide, carbon monoxide and methane from a fluid useful in, or recovered from, manufacturing processes. The process of the invention provides an efficient and cost-effective method of purifying and recycling gases from industrial processes, such as vacuum furnace processes. In particular, the use of vacuum for regeneration has clear advantages, including requiring less time for regeneration; requiring less energy; and having a lower associated cost. Furthermore, the process of the invention is effective at removing nitrogen impurities up to a level of 500 ppm or higher so that the gases may be recycled for long periods, such as up to 12 months, up to 18 months, or up to 24 months, without causing the purification process to lose efficiency.

In embodiment 1, the invention provides a process for purifying a fluid, the process comprising the steps of:
1.1 Providing an insulated adsorption vessel (1) comprising an adsorptive media;
1.2 Providing a first fluid F1;
1.3 Cooling the insulated adsorption vessel (1) and/or cooling the first fluid, F1, to an operating temperature T1 in the range of from −40° C. to −130° C.;
1.4 Contacting the fluid F1 with the insulated adsorption vessel (1) to remove one or more impurities G1;
1.5 Collecting the resulting purified fluid F2; and
1.6 Regenerating the insulated adsorption vessel (1) by vacuum whilst maintaining the temperature of the vessel at a temperature in the range T1 to T1+50° C.

In embodiment 2, the invention provides a process according to embodiment 1, the process further comprising the precursory steps:
0.1 Providing a first adsorption vessel, which may be insulated, comprising an adsorptive media at an operating temperature T1-0 in the range of from +40° C. to −40° C., preferably from +15° C. to +30° C.;
0.2 Providing a first fluid F1-0;
0.3 Contacting the first fluid F1-0 with the adsorption vessel to remove one or more impurities G1-0;
0.4 Collecting the resulting purified first fluid F1.

The purified first fluid F1 is then provided to the process steps as defined in Embodiment 1. Therefore, in embodiment 2, the invention provides a process comprising:
0.1 Providing a first adsorption vessel, which may be insulated, comprising an adsorptive media at an operating temperature T1-0 in the range of from +40° C. to −40° C., preferably from +15° C. to +30° C.;
0.2 Providing a first fluid F1-0;
0.3 Contacting the first fluid F1-0 with the adsorption vessel to remove one or more impurities G1-0;
0.4 Collecting the resulting purified first fluid F1;
1.1 Providing a second adsorption vessel, which is insulated, comprising an adsorptive media, preferably an aluminosilicate (i.e, the insulated adsorption vessel according to embodiment 1);
1.3 Cooling the second adsorption vessel and/or cooling the first fluid, F1, to an operating temperature T1 in the range of from −40° C. to −130° C., preferably from −90° C. to −110° C.;
1.4 Contacting the fluid F1 with the second adsorption vessel to remove one or more impurities G1;
1.5 Collecting the resulting purified fluid F2; and
1.6 Regenerating the second adsorption vessel by vacuum whilst maintaining the temperature of the vessel at a temperature in the range T1 to T1+50° C. (i.e. in the range +10° C. to −130° C.; preferably from −40° C. to −110° C.);
wherein the one or more impurities G1 have a lower freezing point than the one or more impurities G1-0.

It will be appreciated that the second adsorption vessel of Embodiment is the insulated adsorption vessel as defined in Embodiment 1.

In embodiment 3, the invention provides a process according to embodiment 1 or 2, wherein the first fluid F1 or F1-0 is any fluid useful in manufacturing and each G1 or G1-0 is independently selected from nitrogen, oxygen, carbon dioxide, carbon monoxide, methane and mixtures thereof.

In embodiment 4, the invention provides a process according any preceding embodiment, wherein F1 or F1-0 is a noble gas or mixture thereof, more preferably F1 or F1-0 is selected from argon, xenon, helium, neon, and mixtures thereof; and each G1 or G1-0 is independently selected from nitrogen, oxygen, carbon dioxide, carbon monoxide, methane and mixtures thereof.

In an alternative embodiment, 5, the invention provides a process according to any one of embodiments 1 to 3, wherein F1 of F1-0 is methane and G1 or G1-0 is carbon dioxide.

In embodiment 6, the invention provides a process according to any preceding Embodiment or according to Embodiment 13, wherein the insulated adsorption vessel (1) as defined in Embodiment 1, or the second adsorption vessel as defined in Embodiment 2, or the first pair of insulated adsorption vessels as defined in Embodiment 13, has an operating temperature T1 of from −80° C. to −130° C.

In embodiment 7, the invention provides a process according to any preceding embodiment, or according to Embodiment 13, wherein the insulated adsorption vessel (1) as defined in Embodiment 1, or the second adsorption vessel as defined in Embodiment 2, or the first pair of insulated adsorption vessels as defined in Embodiment 13, has an operating temperature of from −90° C. to −110° C.

In embodiment 8, the invention provides a process according to any preceding embodiment, or according to embodiment 13, wherein the insulated adsorption vessel (1) as defined in Embodiment 1, or the second adsorption vessel as defined in Embodiment 2, or the first pair of insulated adsorption vessels as defined in Embodiment 13, has an operating temperature of from −100° C. to −120° C.

In embodiment 9, the invention provides a process according to any one of embodiments 2 to 8, wherein the operating temperature T1-0 is greater than 0° C. and less than or equal to +40° C., more preferably in the range from +15° C. to +30° C. Preferably the operating temperature T1-0 is ambient temperature (i.e. about 25° C.±5° C.). Where the temperature T1-0 is in the range −40° C. to 0° C., the vessel is insulated. However, the skilled person will understand that at warmer temperatures, where T1-0 is in the range 0° C. to +40° C., and particularly in the range +15° C. to +30° C., it is not required to use an insulated vessel.

In embodiment 10, the invention provides a process according to any one of embodiments 2 to 9, further comprising:
  2.1 Providing a third adsorption vessel, which is insulated, comprising an adsorptive media;
  2.2 Adjusting the temperature of the third adsorption vessel and/or the second fluid F2 to an operating temperature T2 in the range of from less than T1 to −130° C.;
  2.3 Contacting the second fluid F2 with the third adsorption vessel to remove one or more impurities G2;
  2.4 Collecting the resulting purified fluid F3; and
  2.5 Independently regenerating the second and third adsorption vessels by vacuum whilst maintaining the temperature of each vessel in the range of from the operating temperature (T1, T2) to the operating temperature +50° C. (i.e. the second insulated adsorption vessel is maintained at a temperature in the range of from +10° C. to −130° C.; preferably from −40° C. to −110° C., and the third insulated adsorption vessel is maintained at a temperature of from less than +10° C. to −130° C.);
  wherein the one or more impurities G1 have a lower freezing point than the one or more impurities G1-0, and the one or more impurities G2 have a lower freezing point than the one or more impurities G1.

In Embodiment 11, the invention provides a process according to Embodiment 10, wherein:
  Temperature T1-0 is greater than 0° C. and less than or equal to +40° C., preferably in the range from +15° C. to +30° C.;
  Temperature T1 is in the range from 0° C. to −50° C.; and
  Temperature T2 is in the range from −40° C. to −130° C., preferably from −90° C. to −110° C.

It is a preferred embodiment of the process that the process provides a pair of insulated adsorption vessels 1A and 1B in order to avoid the need to pause the process during regeneration. As described in more detail hereinbelow, when a pair of insulated adsorption vessels 1A and 1B are used in the process of the invention, one vessel may be online while the other vessel is in regeneration or standby mode.

Therefore, in embodiment 12, the invention provides a process according to any one of the preceding embodiments, the process comprising:
  1.1 Providing a pair of insulated adsorption vessels (1A, 1B) each independently comprising an adsorptive media, preferably an aluminosilicate;
  1.2 Providing a first fluid F1;
  1.3 Cooling the pair of insulated adsorption vessels (1A, 1B) and/or cooling the first fluid F1 to an operating temperature T1 in the range of from −40° C. to −130° C., preferably from −90° C. to −110° C.;
  1.4 Contacting the first fluid F1 with one of the pair of insulated adsorption vessels to remove one or more impurities G1;
  1.5 Collecting the resulting purified fluid F2; and
  1.6 Regenerating one of the pair of insulated adsorption vessels (1A, 1B) by vacuum whilst maintaining the temperature of the vessel in the range of T1 to T1+50° C. (i.e. in the range +10° C. to −130° C.; preferably from −40° C. to −110° C.).

In embodiment 13, the invention provides a process according to any one of embodiments 2 to 11, the process comprising
  0.1 Providing an adsorption vessel (1), which may be insulated, comprising an adsorptive media at an operating temperature T1-0 in the range of from −40° C. to +40° C., preferably from +15° C. to +30° C.;
  0.2 Providing a first fluid F1-0;
  0.3 Contacting the first fluid F1-0 with the adsorption vessel (1) to remove one or more impurities G1-0;
  0.4 Collecting the resulting purified first fluid F1;
  1.1 Providing a first pair of insulated adsorption vessels comprising an adsorptive media, preferably an aluminosilicate;
  1.3 Cooling the first pair of insulated adsorption vessels and/or cooling the first fluid, F1, to an operating temperature T1 in the range of from −40° C. to −130° C., preferably from −90° C. to −110° C.;
  1.4 Contacting the fluid F1 with one of the first pair of insulated adsorption vessel to remove one or more impurities G1;
  1.5 Collecting the resulting purified fluid F2; and
  1.6 Regenerating one of the first pair of insulated adsorption vessel by vacuum whilst maintaining the temperature of the vessel at a temperature in the range T1 to T1+50° C. (i.e. in the range +10° C. to −130° C.; preferably from −40° C. to −110° C.); wherein the one or more impurities G1 have a lower freezing point than the one or more impurities G1-0.

In embodiment 14, the invention provides a process according to any one of embodiments 2 to 11 and 13, wherein the first fluid F1-0 comprises argon.

In embodiment 15, the invention provides a process according to any one of embodiments 2 to 11 and 13 to 14, wherein the one or more impurities G1 or G1-0 comprise $CO_2$, $H_2O$, or mixtures thereof.

In embodiment 16, the invention provides a process according to any one of embodiments 2 to 11 and 13 to 15, wherein the one or more impurities G1 or G1-0 comprise $N_2$, $O_2$, and mixtures thereof.

In embodiment 17, the invention provides a process according to any preceding embodiment, wherein each insulated adsorption vessel independently comprises adsorptive media selected from zeolites, molecular sieves, calcium chloride, calcium sulphate activated carbon, and metal organic frameworks (MOF). When the process is as defined in any one of embodiments 2 to 11 and 13 to 16, the first adsorption vessel preferably comprises adsorptive media selected from molecular sieves, calcium chloride, calcium sulphate and activated carbon; and the second adsorption vessel preferably comprises adsorptive media selected from zeolites, molecular sieves, activated carbon, and metal organic frameworks (MOF). In the process according to any preceding embodiment, crystalline metal aluminosilicates are preferred. Particularly preferred are Group A, X and Y and zeolite Socony mobil-5 (ZSM-5) aluminosilicate zeolites.

In embodiment 18, the invention provides a process according to any preceding embodiment, wherein each insulated adsorption vessel is vacuum insulated. It will be understood that the first adsorption vessel according to embodiment 2 does not require insulation when the operating temperature is from 0° C. to +40° C., more particularly from +15° C. to +30° C.

WO2011092507 discloses a process for purifying a noble gas stream, the process comprising oxidizing impurities in the gas stream and removing the resulting carbon dioxide and water. Such an oxidation step may be carried out prior to the process of the invention.

In embodiment 19, the invention therefore provides an alternative process for purifying a fluid, the process comprising the steps of:
  0.1 Contacting a fluid F0 with an oxidation reactor to oxidise impurities in F0 to $CO_2$ and $H_2O$;
  0.2 Contacting the resulting fluid F0' with an adsorption vessel, A, to remove $CO_2$ and with an additional adsorption vessel, B, to remove $H_2O$; or
  0.3 Contacting the resulting fluid F0' with a combined adsorption vessel AB to remove $CO_2$ and $H_2O$;
  0.4 Collecting the resulting Fluid F1;
  1.1 Providing an insulated adsorption vessel (1) comprising an adsorptive media, preferably an aluminosilicate;
  1.3 Cooling the insulated adsorption vessel (1) and/or the fluid F1 to an operating temperature T1 in the range of from −40° C. to −130° C., preferably from −90° C. to −110° C.;
  1.4 Contacting the optionally cooled fluid F1 with the insulated adsorption vessel to remove one or more impurities G1;
  1.5 Collecting the resulting purified fluid F2; and
  1.6 Regenerating the insulated adsorption vessel (1) by vacuum whilst maintaining the temperature of the vessel in the range from the operating temperature (T1) to the operating temperature +50° C. (i.e. from +10° C. to −130° C., preferably from −40° C. to −110° C.).

In embodiment 20, the invention provides a process according to embodiment 19, wherein the oxidation reactor comprises a solid state oxygen carrier; preferably comprising at least one transition metal oxide; optionally the transition metal oxide is provided on an inert support material comprising an oxide of an element selected from the periodic table classification Group IIIA, Group IVA, Group IIIB, Group IVB and the lanthanide series.

In embodiment 21, the invention provides a process according to any preceding embodiment wherein the step of regenerating the one or more adsorption vessels by vacuum occurs at a pressure in the range of $1.0 \times 10^{-4}$ and $1.0 \times 10^{-3}$ mb; preferably about $6.0 \times 10^{-3}$ mbar, more preferably about $8.0 \times 10^{-3}$ mbar. In one embodiment, the pressure is $2.0 \times 10^{-3}$ mb or less, preferably $2.0 \times 10^{-4}$ mb or less, more preferably $5.0 \times 10^{-5}$ mb or less.

The purified fluid collected from the process according to any embodiment of the invention (F2 or F3) may be recycled for use in a further industrial process such as in a vacuum furnace process for silicon wafer manufacture or in an additive manufacturing process for 3D printing of metallic parts. The cold purified fluid (F2 or F3) removed from the one or more adsorption vessels may be utilized in a heat exchange process to partially cool fluid F1 in accordance with any preceding embodiment. Preferably, fluid F1 is cooled in a two-part process: 1) the temperature of the fluid F1 is reduced in a gas-to-gas heat exchange unit which comprises the fluid F2 (or F3) removed from the first adsorption vessel, or from an additional adsorption vessel; and 2) the fluid F1 is cooled further in a second liquid-to-gas heat exchange unit.

Therefore, in embodiment 22, the invention provides a process according to any preceding embodiment wherein the step of cooling the Fluid F1 comprises the use of a heat exchange unit; preferably a gas-to-gas heat exchange unit.

In embodiment 23, the invention provides a process according to any preceding embodiment, wherein the purified fluid F2 or F3 is utilized to cool the fluid F1 in a gas-to-gas heat exchange unit.

In embodiment 24, the invention provides a process according to embodiment 22 or 23, wherein the step of cooling the fluid F1 additionally comprises the use of a second heat exchange unit, preferably a liquid-to-gas heat exchange unit, which is connected to a low temperature generator comprising a cryogenic liquid in the temperature range −80° C. to −150° C.

In embodiment 25, the invention provides a process according to embodiment 24, wherein the cryogenic liquid is selected from any suitable liquid, preferably propanol.

The skilled person will appreciate that since the adsorption vessels are insulated, the adsorptive media remains cold for many adsorption/desorption (or regeneration) cycles, thus reducing energy requirements.

In embodiment 26, the invention provides an apparatus for use in a process as defined in any one of the preceding embodiments, the apparatus comprising:
  Optionally a heat exchange unit suitable for cooling a fluid F1 to a temperature in the range of from −40° C. to −130° C., preferably from −90° C. to −110° C.,
  An insulated adsorption vessel comprising an adsorptive media, preferably an aluminosilicate;
  One or more isolation valves; and
  A multi-stage vacuum pump.

In embodiment 27, the invention provides an apparatus according to embodiment 26, wherein the heat exchange unit comprises a first gas-to-gas heat exchange unit; and optionally a second liquid-to-gas heat exchange unit which is connected to a low temperature generator comprising a cryogenic liquid in the temperature range of from −80° C. to −150° C.

In embodiment 28, the invention provides an apparatus according to embodiment 26 or 27, wherein the insulated adsorption vessel is vacuum insulated.

In embodiment 29, the invention provides an apparatus according to any one of embodiments 26 to 28, wherein the adsorptive media is selected from zeolites, molecular sieves, calcium chloride, calcium sulphate, activated carbon, and metal organic frameworks (MOF). In the apparatus according to embodiment 29, crystalline metal aluminosilicates are preferred. Particularly preferred are Group A, X and Y and zeolite Socony mobil-5 (ZSM-5) aluminosilicate zeolites.

In embodiment 30, the invention provides an apparatus according to any one of embodiments 26 to 29, wherein the multi-stage vacuum pump is suitable for reducing the pressure in the adsorption vessel to a pressure in the range $1.0 \times 10^{-4}$ and $1.0 \times 10^{-3}$ mb, over a period of 5 to 10 hours; preferably the multi-stage vacuum pump is a two-stage or three stage vacuum pump. In the apparatus according to embodiment 30, the multi-stage vacuum pump is suitable for reducing the pressure to $2.0 \times 10^{-3}$ mb or less, preferably $2.0 \times 10^{-4}$ mb or less, more preferably $5.0 \times 10^{-5}$ mb or less.

In embodiment 31, the invention provides an apparatus according to any one of embodiments 26 to 30, which further comprises a vent valve to reduce the pressure inside the adsorption vessel to atmospheric pressure.

In embodiment 32, the invention provides an apparatus according to any one of embodiments 26 to 31, wherein the adsorption vessel comprises a pair of insulated adsorption vessels (1A and 1B).

In embodiment 33, the invention provides an apparatus according to any one of embodiments 26 to 32, which comprises two or more heat exchange units.

In embodiment 34, the invention provides an apparatus according to any one of embodiments 26 to 33, which further comprises a moisture sensor.

In embodiment 35, the invention provides an apparatus according to any one of the embodiments 26 to 33 which comprises one adsorption vessel operating at a temperature in the range of +15° C. to +30° C. and one insulated adsorption vessel operating at a temperature of −40° C. to −130° C., preferably from −90° C. to −110° C. each vessel independently comprising an adsorptive media.

Definitions

The term 'a' or 'an' as used herein refers to both the singular and plural.

The term 'fluid' as used herein refers to both the gaseous and liquid state. For example, a fluid (F1, F2, F3) may be in the liquid state at one temperature but in the gaseous state at a higher temperature.

The term 'noble gas' as used herein, refers to the gases of group 18 (also referred to as group 8) and comprises the gases helium, neon, argon, krypton, xenon and radon.

The term 'adsorption' as used here refers to adhesion of molecules of a gas or liquid to the surface of a solid material (the adsorptive media).

The term 'adsorptive media' as used herein refers to a solid material which is capable of adsorption of one or more impurities in the fluid (F1).

The term 'molecular sieves', as used herein refers to crystalline metal aluminosilicates, or zeolites, having a three-dimensional interconnecting network of silica and alumina tetrahedra. Crystalline metal aluminosilicates are preferred. Zeolites are crystalline aluminosilicate minerals that have a characteristic pore structure and can be grouped according to the Si/Al ratio in their atomic structure. Group A zeolites have a Si/Al ratio of 1. Group X zeolites have a Si/Al ratio of 1 to 1.5. Group Y zeolites have a Si/Al ratio of 1.5 to 3.0 and the ZSM group have Si/Al ratios greater than 10. Particularly preferred for use in the invention are Group A, X and Y zeolites and zeolite Socony mobil-5 (ZSM-5) aluminosilicate zeolites.

The term 'metal organic framework (MOO' as used herein refers to crystalline materials that consist of coordination bonds between transition-metal cations and multidentate organic linkers, and have an open framework that can be porous.

The term 'vacuum regeneration' refers to a process of removing the impurities adsorbed onto the adsorptive media by reducing the pressure in the adsorption vessel using a multi-stage vacuum pump. Vacuum regeneration is suitably carried out at a pressure of $2.0 \times 10^{-3}$ mb or lower; preferably at a pressure of $2.0 \times 10^{-4}$ mb or lower or a pressure of $5.0 \times 10^{-5}$ mb or lower.

Examples

The invention is described in further detail hereinbelow with reference to the figures.

The apparatus for use in the process of the invention is depicted in FIG. 1 wherein a fluid F1 is passed through the adsorption vessel 1 to produce a second fluid F2.

The fluid to be purified F1 (the inlet gas) enters the system at 2 and passes through vacuum insulated gas lines to the insulated adsorption vessel 1, where the various impurity species are removed such as nitrogen, methane, oxygen etc, before exiting the system at 16.

The insulated adsorption vessel 1 is cycled between online, where it operates to remove impurities from the fluid F1, to regeneration, where the impurities absorbed by the adsorptive media within the vessel are removed. When the adsorption vessel 1 is in operation, vacuum valve 12 is closed isolating vessel 1 from the multi-stage vacuum pump 11. To regenerate, vacuum valves 8, 9 and 14 are closed, and the vessel 1 is vented to atmosphere 15 through vacuum valve 13. Valve 13 is then closed and vacuum valve 14 opened to allow the vessel 1 to be evacuated by the multi-stage vacuum pump 11

Figure 2:
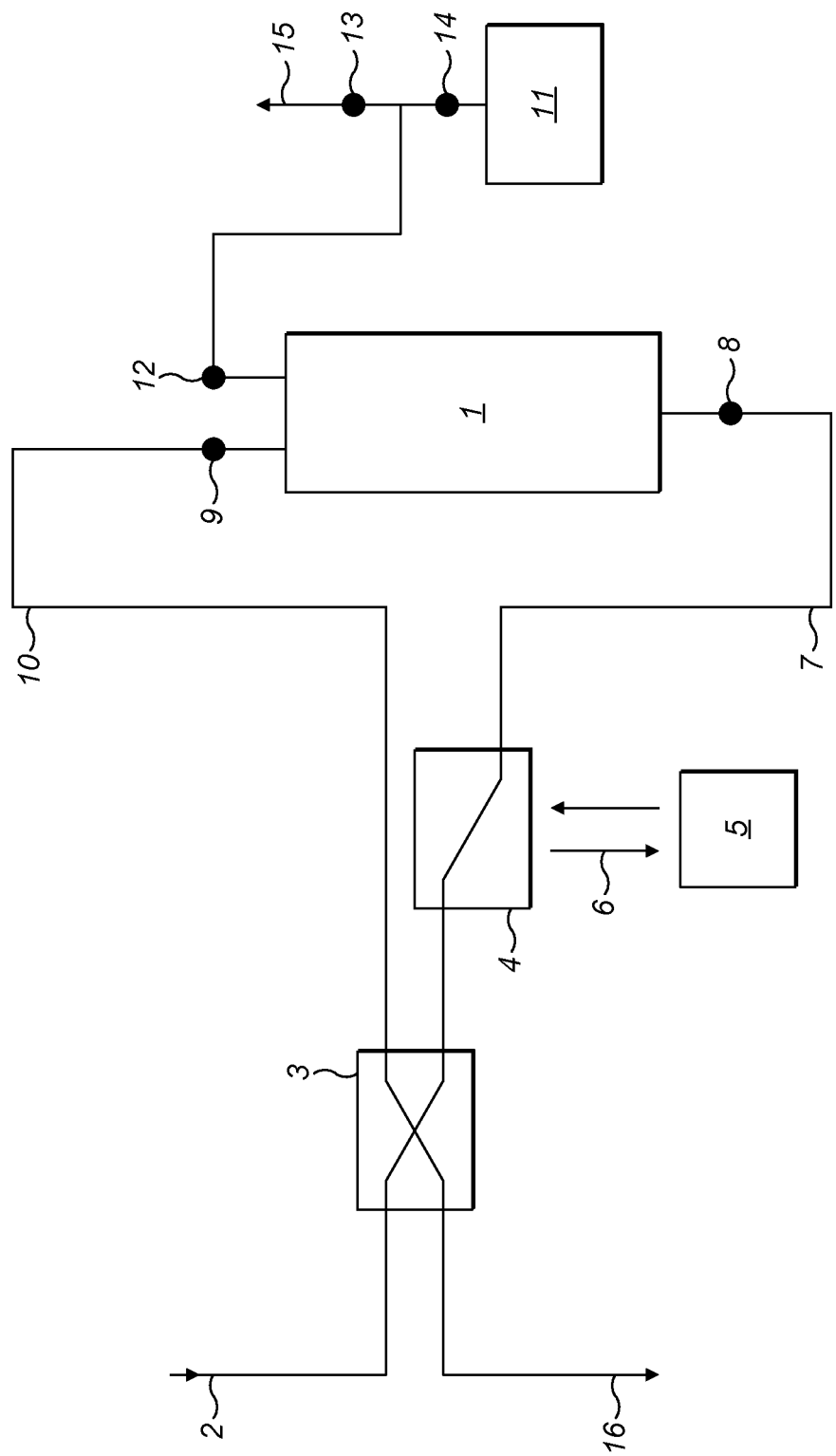
FIG. 2 shows an apparatus of the invention wherein the fluid is cooled using a heat exchange unit.

The apparatus for use in the process of the invention is depicted in FIG. 2 wherein a fluid F1 is first cooled and then purified on being passed through the adsorption vessel 1 to produce a second fluid F2.

The fluid to be purified F1 (the inlet gas) enters the system at 2 and passes through a first gas-gas heat exchanger 3, where it is cooled by the purified second fluid (the outlet gas stream) F2. F1 then passes through a second liquid-gas heat exchanger 4 where it is cooled further to the operating temperature of between −50 and −130° C. and the cooled fluid F1 then passes through vacuum insulated gas lines to the insulated adsorption vessel 1. The cooling fluid for heat exchanger 4 is generated in a cryo-cooler 5 and circulated through heat exchanger 4 through insulated lines 6. The insulated adsorption vessel 1 is cycled between online, where it operates to remove impurities from the fluid F1, to regeneration, where the impurities absorbed by the adsorptive media within the vessel are removed.

Cooled fluid F1, exiting heat exchanger 4, then passes through insulated gas lines 7 and through valve 8 into the absorption vessel 1. Vacuum valve 12 is closed isolating vessel 1 from the multi-stage vacuum pump 11. The fluid F1 passes through vessel 1 where the various impurity species are removed such as nitrogen, methane, oxygen etc, and exits through valve 9 as a purified fluid F2. F2 is passed through further insulated gas lines 10 to heat exchanger 3 where F2 (outlet gas) cools the fluid F1 (inlet gas) and is itself warmed prior to exiting the system at 16.

To regenerate, vacuum valves 8, 9 and 14 are closed, and the vessel 1 is vented to atmosphere 15 through vacuum valve 13. Valve 13 is then closed and vacuum valve 14 opened to allow the vessel 1 to be evacuated by the multi-stage vacuum pump 11

Figure 3:
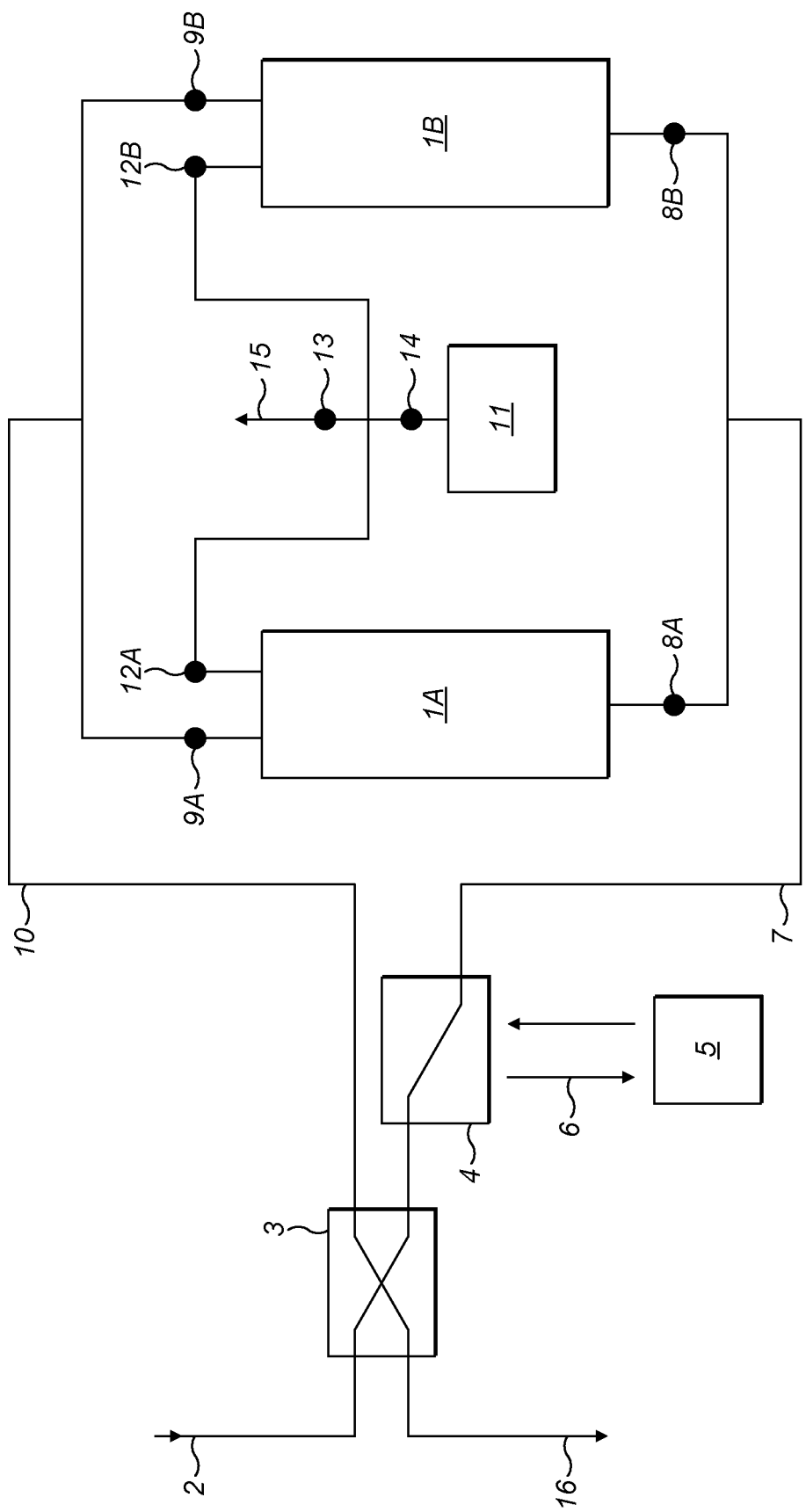
FIG. 3 shows an apparatus of the invention comprising a pair of adsorption vessels.

Preferably the apparatus for use in the process of the invention comprises two insulated adsorption vessels 1A and 1B as shown in FIG. 3. The system comprises two absorption vessels 1A, 1B which are vacuum insulated. The vessels are cycled between online, where they operate to remove impurities from the gas stream, to regeneration where the impurities adsorbed by the material within the vessel are removed. The following sequence assumes a starting point where vessel 1A is online and vessel 1B is in regeneration. Cooled fluid F1 exiting heat exchanger 4 passes through insulated gas lines 7 and through valve 8A into the absorption vessel 1A. Vacuum valve 12A is closed isolating vessel 1A from the multi-stage vacuum pump and valve 8B and 9B are closed isolating vessel 1B from the inlet and outlet gas streams. The fluid passes through vessel 1A, where the various impurity species are removed, and the purified fluid F2 exits through valve 9A passing through further insulated gas lines 10 to heat exchanger 3 where it cools the fluid F1 (inlet gas) and is itself warmed prior to exiting the system at 16. Whilst vessel 1A is online, vessel 1B is being regenerated by the multi-stage vacuum pump 11 with valves 8B, 9B and 13 closed to isolate the system and vacuum valves 12B and 14 open. The pressure in vessel 1B is reduced to a pressure in the range $1.0 \times 10^{-4}$ and $1.0 \times 10^{-3}$ mb and the impurity species thus removed. When vessel 1A requires regeneration and vessel 1B is to be brought online, the vessels are briefly operated in parallel before regenerating vessel 1A. At the change over time, vacuum valves 12B and 14 are closed, valve 8B is opened to allow pressurization of vessel 1B, and when 1B is at the operating pressure, valve 9B is opened so that the vessels operate in parallel. Subsequently, valves 8A and 9A are closed, isolating vessel 1A from the inlet and outlet gas streams (F1 and F2). Valve 13 and vacuum valve 12A are opened allowing vessel 1A to depressurize through vent line 15. Once vessel 1A is at atmospheric pressure, valve 13 is closed and vacuum valve 14 opened to pump down vessel 1A. The above sequence is cycled every 8-10 hours or at a frequency governed by the temperature of the vessel being regenerated, such that the temperature is maintained at no more than 50° C. above the temperature of the fluid F1, typically no more than 20° C., preferably no more than 10° C.

Figure 4:
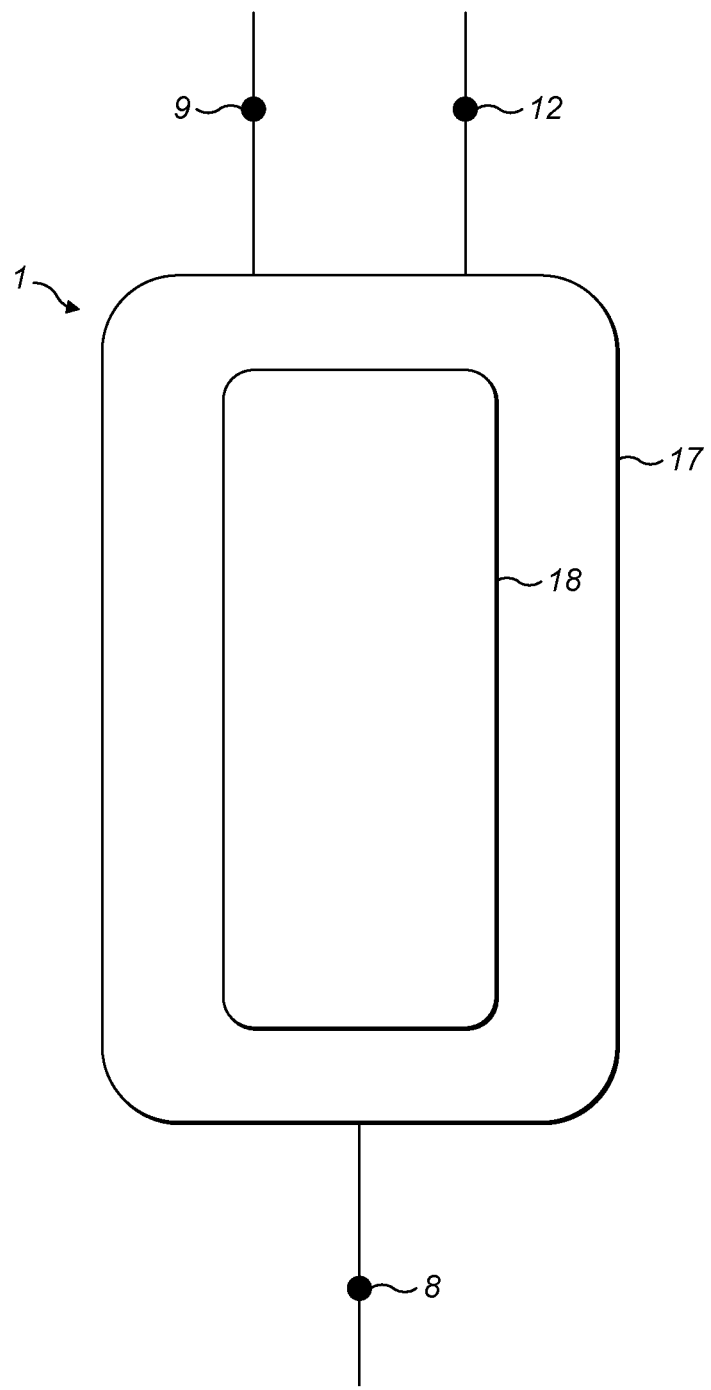
FIG. 4 shows the construction of the adsorption vessel.

The construction of the adsorption vessel 1 is shown more clearly in FIG. 4. The adsorption vessel 1 comprises a core of adsorptive media 18, surrounded by an insulated sleeve 17 which is preferably vacuum insulated.

Figure 5:
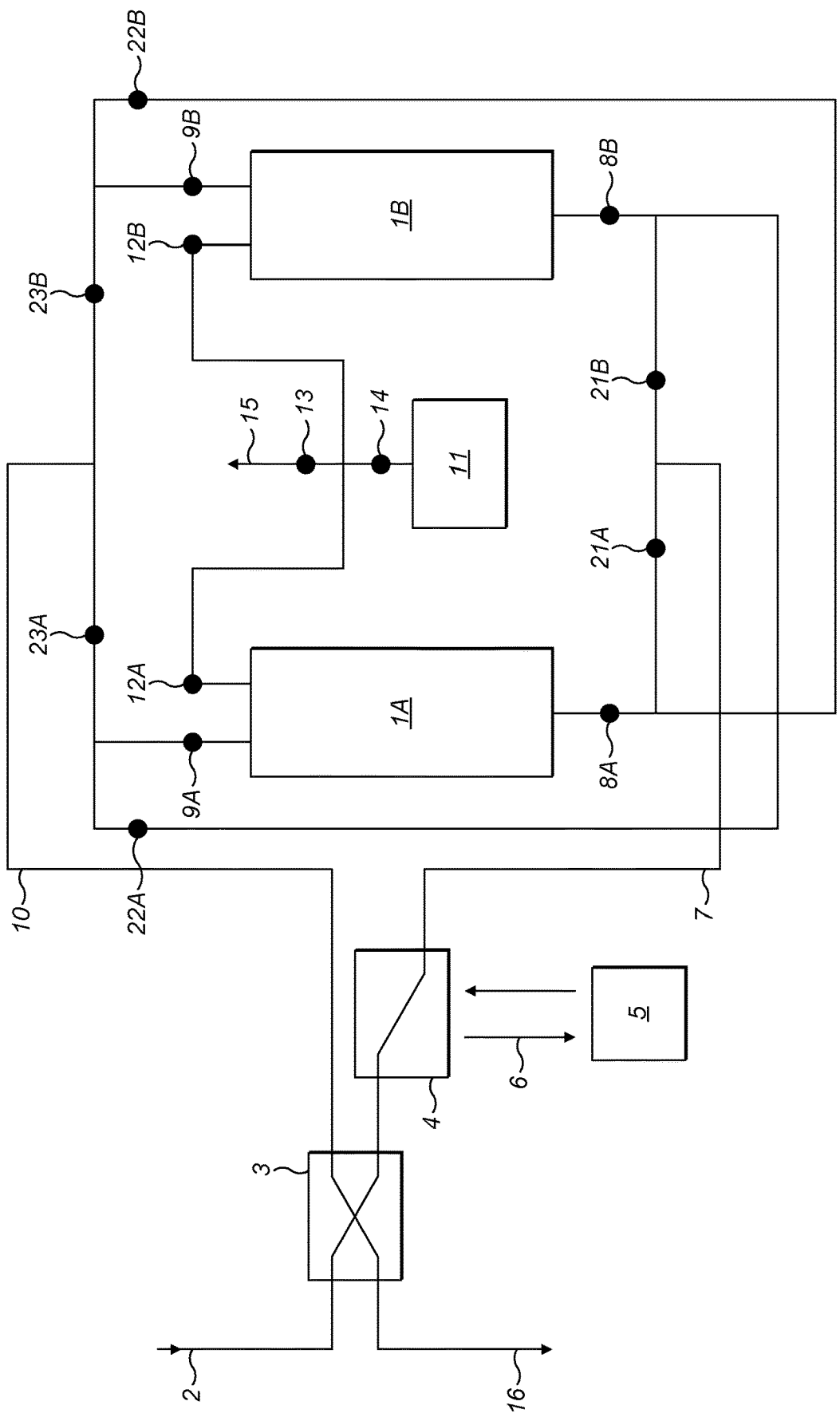
FIG. 5 shows an apparatus of the invention comprising a pair of adsorption cells and further comprising an alternative regeneration process.

An alternative method to complete the regeneration of the offline vessel (1A or 1B) is shown in FIG. 5 through the addition of valves 21 through to 23. Such an arrangement allows for cooling of the regenerated bank using fluid 1 prior to passing through the online adsorption vessel. Taking the example above, with vessel 1A online and vessel 1B under vacuum, the additional valves are operated such that valve 21A is open, Valve 22A is shut and valve 23A is open along with valves 8A and 9A routing gas through vessel 1A as before, whilst valve 21B is shut, valve 22B is shut and valve 23B is shut along with 8B and 9B. As detailed above, valves 12B and 14 are closed and valves 21B and 8B are opened to allow pressurisation of vessel 1B. When valves 9*b* and 22B are opened whilst valve 21A is closed, fluid F1 is routed through the now regenerated vessel 1B, cooling it in the process, and then through vessel 1A as before. Once vessel 1B is within 10-50° C., typically within 20° C., of the temperature of the incoming fluid F1, valve 23B is opened and valve 23A closed, routing fluid F1 through the cooled and regenerated vessel 1B and out. Valves 8A, 9A are now closed, isolating vessel 1A. The pressure in 1A is now reduced relative to atmospheric by opening valve 12A and valve 13 and venting through 15. The vacuum regeneration process then continues as detailed above. It is noted that in a preferred embodiment, valves 23A and 23B could be combined into a 3-port valve. In so doing, dead volumes are reduced. In addition, the valve logic could be combined into a single multi-ported rotary driven valve to effect the same process as shown in FIGS. 3 and 5.

Figure 6:
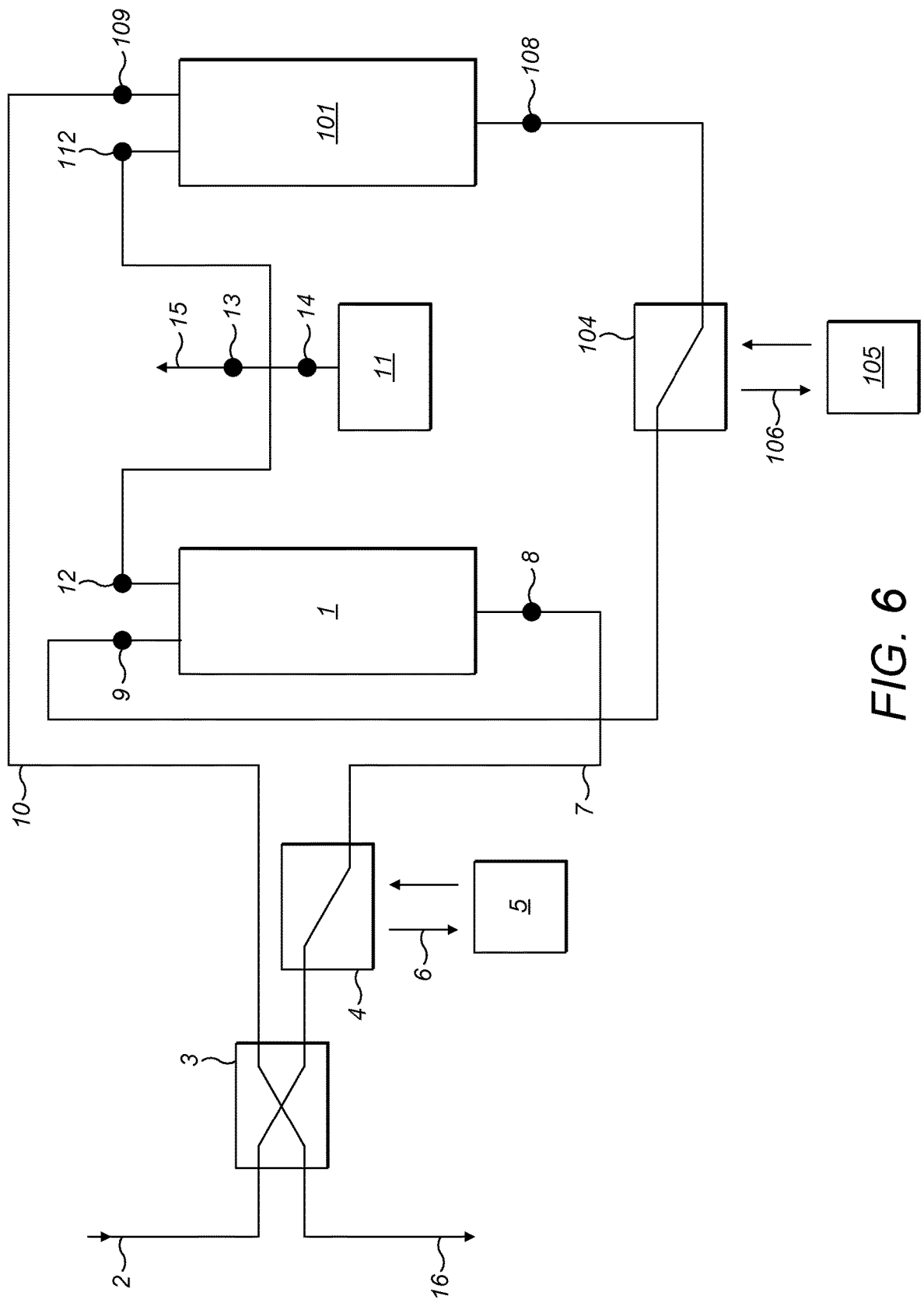
FIG. 6 shows an apparatus of the invention comprising two adsorption cells operating at different temperatures.

FIG. 6 depicts the process according to embodiment 2, wherein T1-0 is in the range of form 0° C. to −40° C. A fluid F1-0 is purified on being passed through the adsorption vessel (1) at temperature T1-0 to produce a purified fluid F1, the purified fluid F1 being further purified on being passed through a second adsorption vessel (101) at temperature T1 to produce a second fluid F2. The fluid to be purified F1-0 enters the system at 2 and passes through a first gas-gas heat exchanger 3, where it is cooled by the purified third fluid (the outlet gas stream) F2.

F1-0 then passes through a first liquid-gas heat exchanger 4 where it is cooled further to the operating temperature, T1-0, and the cooled fluid F1-0 then passes through vacuum insulated gas lines to the insulated adsorption vessel (1) and is purified resulting in fluid F1. The cooling fluid for heat exchanger 4 is generated in a cryo-cooler 5 and circulated through heat exchanger 4 through insulated lines 6. F1 then passes through a second liquid-gas heat exchanger 104 where it is cooled further to the operating temperature T1 of between −40° C. and −130° C., and the cooled fluid F1 then passes through vacuum insulated gas lines to the insulated adsorption vessel 101 and is purified, resulting in fluid F2. The cooling fluid for heat exchanger 104 is generated in a cryo-cooler 105 and circulated through heat exchanger 104 through insulated lines 106.

The insulated adsorption vessels 1 and 101 are cycled between online, where they operate to remove impurities from the fluids F1-0 and F1, to regeneration, where the impurities absorbed by the adsorptive media within the vessel are removed using vacuum.

When the operating temperature of the adsorption vessel (I) is in the range 0° C. to +40° C., it is not necessary to cool the fluid F1-0 by passing the fluid through the gas-gas heat exchanger 3 and liquid-gas hear exchanger 4. In this embodiment, the fluid F1-0 may pass from point 2 into the adsorption vessel (I) without prior cooling.

In a preferred embodiment, the insulated adsorption vessels 1 and 101 comprise pairs of insulated adsorption vessels (1A and 1B, 101A and 101B) as described in embodiment 13.

Results

A range of aluminosilicate and carbon-based materials were tested in cryogenic conditions (from −70° C. to −110° C.) for the removal of $N_2$ from an Ar feed fluid. The feed fluid (F1) composition varied from 50 ppm to 200 ppm $N_2$ (with the balance Ar), and the $N_2$ impurity was removed by suitable adsorptive media via gas adsorption. The saturated materials were later regenerated by vacuum. This process was investigated in two columns with internal diameters of around 10 mm and 40 mm. The 10 mm-column allowed preliminary tests for various adsorptive media and a more detailed investigated was carried out using the 40 mm-diameter column, a fixed bed normally fully packed with adsorptive media. The results showed an acceptable performance for a number of different media, with the best results observed using 13X and 5A zeolite, both of which were shown to give promising duration for breakthrough of nitrogen. The effect of $H_2O$ (around 100 ppm), $CO_2$ (around 2500 ppm) on the adsorption of $N_2$ in cold was also investigated. The presence of moisture and $CO_2$ was observed to affect the $N_2$ adsorption, and was also observed to significantly slow down the vacuum regeneration of the material.

TABLE 1

Adsorptive Media Tested in a 10 mm Column at an operating temperature (T1) of −105° C. ± 2° C.

| Type of materials | Details | Material description | Time to 10 ppm breakthrough |
|---|---|---|---|
| Alumino-silicate zeolite | Group A: 3A, 4A, 5A | Si/Al ratio = 1, pore openings: 0.3 nm for 3A, 0.4 for 4A, 0.5 for 5A | 5A: within above 80 min 4A: between 40 to 80 min |
| | Group X: 13X | Si/Al ratio = 1-1.4, pore opening: 0.74-1 nm | 13X: within above 80 min |
| | Group Y: NaY | Si/Al ratio = 1.5 to 3, Pore opening: 0.74-1 nm | NaY: between 40 to 80 min |
| | Zeolite Socony mobil-5 (ZSM-5) | Si/Al ratio > 10 Pore opening: 0.5-0.6 nm | ZSM: between 40 to 80 min |
| Carbon-based materials | Activated alumina carbon molecular sieve, activated carbon | — — | within 5 min within 5 min |

TABLE 2

Adsorptive Media Tested in a 40 mm-diameter (60 g scale) column at an operating temperature (T1) of −105° C. ± 2° C.

| | Time to breakthrough (min) | |
|---|---|---|
| | 0.1 ppm | 10 ppm |
| 4A | 40 ± 2 | 70 ± 2 |
| 5A | 55 ± 5 | 138 ± 8 |
| 13X | 125 ± 15 | 175 ± 10 |
| NaY | 42 ± 3 | 55 ± 6 |
| ZSM-5 | 28 ± 3 | 42 ± 7 |

Adsorption Temperature

Adsorption was tested in different adsorptive media at an operating temperature (T1) of −90° C. to −110° C. (Range 1), using the 40 mm diameter column. The media tested showed a time of >40 min for 10 ppm breakthrough of nitrogen. The zeolites 5A and 13X showed a time of >130 min for breakthrough for 10 ppm nitrogen. The zeolite 13X was also tested at an operating temperature of −65° C. to −75° C. (range 2). At this temperature range, 10 ppm breakthrough was observed within 10 minutes.

Vacuum Level

Typically, the insulated adsorption vessel (1) was de-gassed using a multi-stage vacuum pump before adsorption. The vacuum level was observed to reach an initial level of $4.4 \times 10^{-3}$ mbar to $4.8 \times 10^{-3}$ mbar. Following adsorption with 100 ppm $N_2$ (balance Ar) to reach breakthrough, the insulated adsorption vessel (1) was regenerated or partially regenerated using the multi-stage vacuum pump, depending on the regeneration temperature.

Figure 7A:
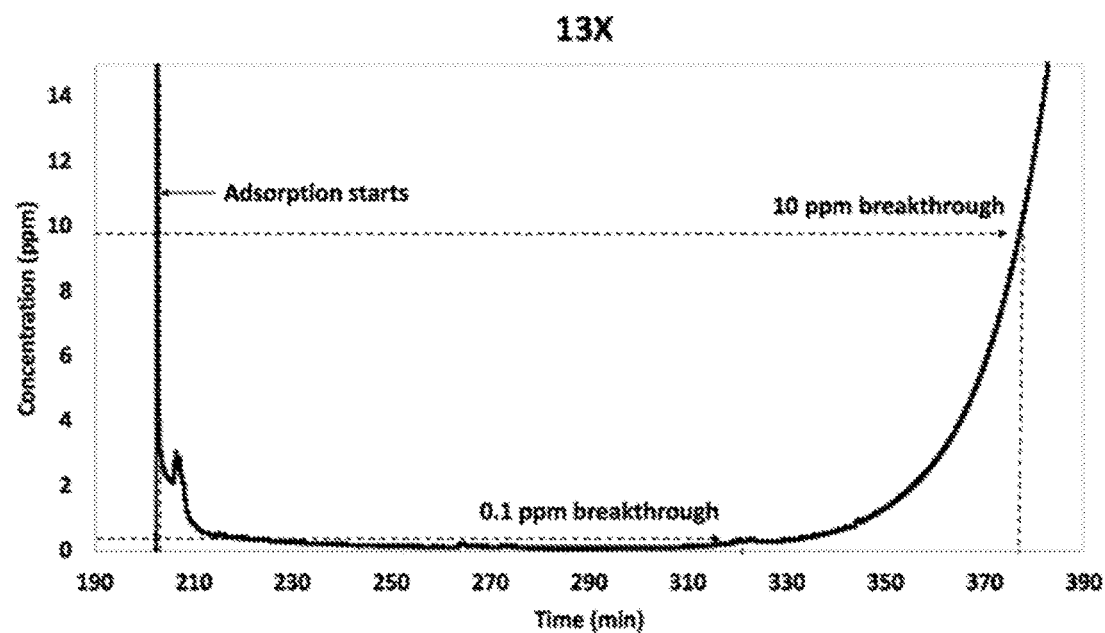
FIG. 7 shows the adsorption of 100 ppm of Nitrogen during the process of the invention.

FIG. 7A depicts the adsorption of 100 ppm Nitrogen when the process of the invention is operated using a 10 mm diameter column. Aluminosilicate 13X was used as the adsorptive media, with an operating temperature T1 of −105° C. +1-2° C., with a gas flow rate of 1 slm, in a 40 mm-scale insulated adsorption column. Breakthrough at 0.1 ppm or below for 315 minutes, while 10 ppm breakthrough was observed only after 380 minutes.

Figure 7B:
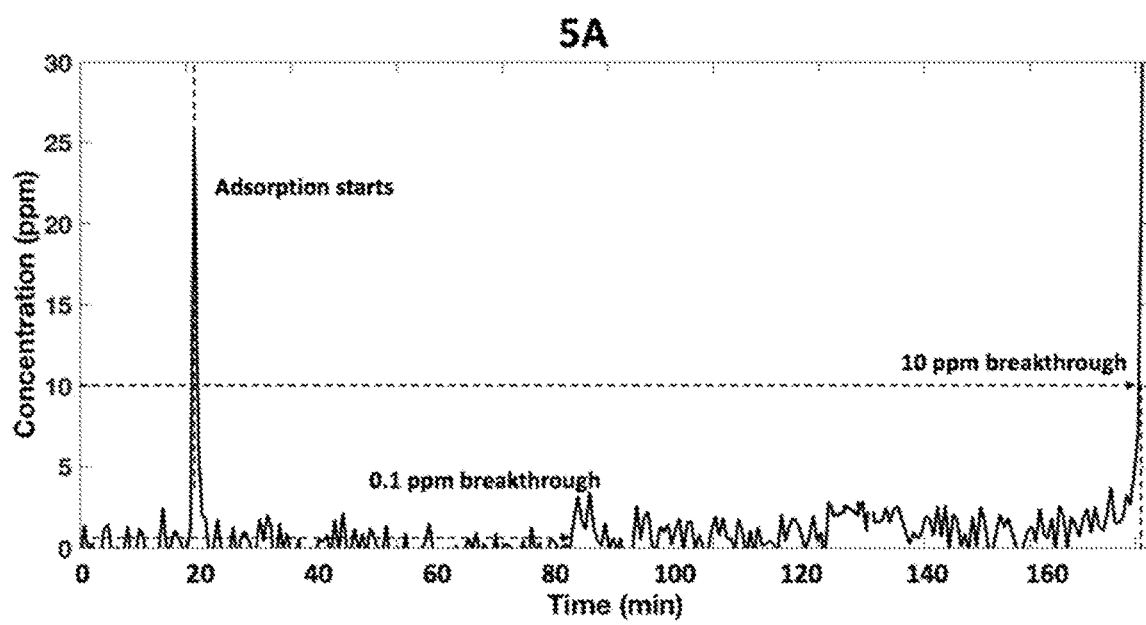

FIG. 7B depicts the adsorption of 100 ppm Nitrogen using pre-adsorbed 5A as the adsorptive media in a 40 mm-scale adsorption column. Other conditions were as described for FIG. 7A. In this example, 10 ppm breakthrough was observed after 160 minutes.

Further Embodiments

The invention is further illustrated by the following embodiments:

E1 A process for purifying a fluid, the process comprising the steps of:
Providing an insulated adsorption vessel (1) comprising an adsorptive media;
Providing a first fluid F1;
Cooling the insulated adsorption vessel (1) and/or cooling the first fluid, F1, to an operating temperature T1 in the range of from −40° C. to −130° C.;
Contacting the fluid F1 with the insulated adsorption vessel (1) to remove one or more impurities G1;
Collecting the resulting purified fluid F2; and
Regenerating the insulated adsorption vessel (1) by vacuum whilst maintaining the temperature of the vessel at a temperature in the range T1 to T1+50° C.

E2 A process for purifying a fluid, the process comprising the steps of:
Providing a first insulated adsorption vessel (1) comprising an adsorptive media;
Providing a first fluid F1;
Optionally adjusting the temperature of the first insulated adsorption vessel (1) and/or the first fluid, F1, to an operating temperature T1 in the range of from +40° C. to −130° C.;
Contacting the first fluid F1 with the first insulated adsorption vessel to remove one or more impurities G1;
Collecting the resulting purified second fluid F2;
Providing a second insulated adsorption vessel (101) comprising an adsorptive media;
Optionally adjusting the temperature of the second insulated adsorption vessel and/or the second fluid F2 to an operating temperature T2 in the range of from less than T1 to −130° C.;
Contacting the second fluid F2 with the second insulated adsorption vessel to remove one or more impurities G2;
Collecting the resulting purified fluid F3; and
Independently regenerating each of the insulated adsorption vessels (1, 101) by vacuum whilst maintaining the operating temperature of each vessel in the range of from the operating temperature (T1, T2) to the operating temperature +50° C.;
wherein the one or more impurities G2 have a lower freezing point than the one or more impurities G1.

E3 A process according to embodiment E1, the process comprising:
Contacting a fluid F0 with an oxidation reactor to oxidise impurities in F0 to $CO_2$ and $H_2O$;
Contacting the resulting fluid F0' with an adsorption vessel, A, to remove $CO_2$ and with an additional adsorption vessel, B, to remove $H_2O$; or Contacting the resulting fluid F0' with a combined adsorption vessel AB to remove $CO_2$ and $H_2O$;

Collecting the resulting Fluid F1;

Providing an insulated adsorption vessel (1) comprising an adsorptive media;

Cooling the insulated adsorption vessel (1) and/or the fluid F1 to an operating temperature T1 in the range of from −40° C. to −130° C.;

Contacting the fluid F1 with the insulated adsorption vessel to remove one or more impurities G1;

Collecting the resulting purified fluid F2; and

Regenerating the insulated adsorption vessel (1) by vacuum whilst maintaining the temperature of the vessel at a temperature in the range T1 to T1+50° C.

E4 A process according to embodiment E1, the process comprising:

Providing a pair of insulated adsorption vessels (1A, 1B) each independently comprising an adsorptive media Providing a first fluid F1;

Cooling the insulated adsorption vessels (1, 101) and/or cooling the first fluid F1 to an operating temperature T1 in the range of from −40° C. to −130° C.;

Contacting the first fluid F1 with one of the pair of insulated adsorption vessels to remove one or more impurities G1;

Collecting the resulting purified fluid F2; and

Regenerating one of the pair of insulated adsorption vessels (1A, 1B) by vacuum whilst maintaining the temperature of each vessel in the range of T1 to T1+50° C.

E5 A process according to Embodiment E3, the process comprising

Providing a first pair of insulated adsorption vessels each independently comprising an adsorptive media;

Providing a first fluid, F1;

Adjusting the temperature of one or both of first pair of insulated adsorption vessels and/or the first fluid F1 to an operating temperature in the range of +40° C. to −130° C.

Contacting the first fluid F1 with one of the first pair of insulated adsorption vessel to remove one or more first impurities G1;

Collecting the resulting purified second fluid F2;

Providing a second pair of insulated adsorption vessels comprising an adsorptive media;

Adjusting the temperature of one or both of the second pair of insulated adsorption vessels and/or the second fluid F2 to an operating temperature T2 in the range of less than T1 to −130° C.;

Contacting the second fluid F2 with one of the second pair of insulated adsorption vessels to remove one or more second impurities G2; and Independently regenerating one of the first and second pair of insulated adsorption vessels by vacuum whilst maintaining the temperature of the vessels in the range of the operating temperature (T1 or T2) to the operating temperature +50° C.;

wherein the one or more second impurities G2 have a lower freezing point than the one or more first impurities G1.

E6 A process according to any one of embodiments E1-E5, wherein fluid F1 is a noble gas or mixture thereof; and each G1 is independently selected from nitrogen, oxygen, carbon dioxide, carbon monoxide, methane and mixtures thereof.

E7 A process according to any one of embodiments E1-E6, wherein each insulated adsorption vessel independently comprises adsorptive media selected from zeolites, molecular sieves, calcium chloride, calcium sulphate activated carbon, and metal organic frameworks (MOF).

The invention claimed is:

1. A process for purifying a fluid, the process comprising the steps of:

1.1 Providing an insulated adsorption vessel (1) comprising an adsorptive media;

1.2 Providing a first fluid F1;

1.3 Cooling the insulated adsorption vessel (1) and/or cooling the first fluid F1, to an operating temperature T1 in the range of from −40° C. to −130° C.;

1.4 Contacting the first fluid F1 with the insulated adsorption vessel (1) to remove one or more impurities G1, thereby providing a resulting purified fluid F2;

1.5 Collecting the resulting purified fluid F2; and 1.6 Regenerating the insulated adsorption vessel (1) by vacuum at a pressure of $2.0 \times 10^{-3}$ mb or less whilst maintaining the temperature of the insulated adsorption vessel (1) at a temperature in the range T1 to T1+50° C.

2. A process for purifying a fluid according to claim 1, the process further comprising the steps of:

0.1 Providing a first adsorption vessel, which is optionally insulated, comprising an adsorptive media at an operating temperature T1-0 in the range of from +40° C. to −40° C.;

0.2 Providing a first fluid F1-0;

0.3 Contacting the first fluid F1-0 with the first adsorption vessel to remove one or more impurities G1-0, thereby providing a resulting purified first fluid F1; and 0.4 Collecting the resulting purified first fluid F1 to be used as the first fluid F1;

wherein the one or more impurities G1 have a lower freezing point than the one or more impurities G1-0.

3. A process according to claim 2, wherein the operating temperature T1 is in the range −90° C. to −110° C.

4. A process according to claim 2, wherein the adsorptive media is selected from crystalline metal aluminosilicates.

5. A process according to claim 2, wherein regeneration of the insulated adsorption vessel (1) in step 1.6 is carried out at a pressure in the range of from $1.0 \times 10^{-4}$ mbar to $1.0 \times 10^{-3}$ mbar.

6. A process according to claim 2, wherein the insulated adsorption vessel (1) comprises a pair of insulated adsorption vessels.

7. A process for purifying a fluid according to claim 1, the process further comprising the steps of:

0.1 Contacting a fluid F0 with an oxidation reactor to oxidise impurities in the fluid F0 to $CO_2$ and $H_2O$, thereby providing a resulting fluid F0';

0.2 Contacting the resulting fluid F0' with an adsorption vessel A, to remove $CO_2$ and with an additional adsorption vessel B, to remove $H_2O$, thereby providing a resulting purified first fluid F1; or 0.3 Contacting the resulting fluid F0' with a combined adsorption vessel AB to remove $CO_2$ and $H_2O$, thereby providing the resulting purified first fluid F1; and 0.4 Collecting the resulting purified first fluid F1 to be used as the first fluid F1.

8. A process according to claim 7, wherein the operating temperature T1 is in the range −90° C. to −110° C.

9. A process according to claim 7, wherein the adsorptive media is selected from crystalline metal aluminosilicates.

10. A process according to claim 7, wherein regeneration of the insulated adsorption vessel (1) in step 1.6 is carried out at a pressure in the range of from $1.0 \times 10^{-4}$ mbar to $1.0 \times 10^{-3}$ mbar.

11. A process according to claim 7, wherein the insulated adsorption vessel (1) comprises a pair of insulated adsorption vessels.

12. A process according to claim 1, wherein the operating temperature T1 is in the range −90° C. to −110° C.

13. A process according to claim 1, wherein the adsorptive media is selected from crystalline metal aluminosilicates.

14. A process according to claim 1, wherein regeneration of the insulated adsorption vessel (1) in step 1.6 is carried out at a pressure in the range of from $1.0 \times 10^{-4}$ mbar to $1.0 \times 10^{-3}$ mbar.

15. A process according to claim 1, wherein the insulated adsorption vessel (1) comprises a pair of insulated adsorption vessels.

16. An apparatus configured to carry out the process of claim 1, the apparatus comprising:
  a) Optionally, a heat exchange unit suitable for cooling the first fluid F1 to a temperature in the range of from −40° C. to −130° C.;
  b) The insulated adsorption vessel (1) comprising the adsorptive media;
  c) One or more isolation valves; and
  d) A multi-stage vacuum pump configured to achieve the pressure of $2.0 \times 10^{-3}$ mb or less.

\* \* \* \* \*